United States Patent [19]

Nishibori et al.

[11] Patent Number: 5,801,205

[45] Date of Patent: Sep. 1, 1998

[54] REPROCESSED RESIN FORMED OF THERMOSET RESIN FORMED MATERIAL, METHOD FOR REPROCESSING THERMOSET RESIN FOAMED MATERIAL AND METHOD FOR MOLDING MOLDED ARTICLE FORMED OF THE REPROCESSED RESIN

[75] Inventors: Sadao Nishibori, Tokyo; Takuji Kajiwara, Okazaki, both of Japan

[73] Assignee: EIN Engineering Co., Ltd., Tokyo, Japan

[21] Appl. No.: 659,604

[22] Filed: Jun. 6, 1996

[30] Foreign Application Priority Data

Jun. 19, 1995 [JP] Japan .................................. 7-151849

[51] Int. Cl.$^6$ .................................................. C08J 9/35
[52] U.S. Cl. ........................... 521/54; 521/134; 521/136; 521/137
[58] Field of Search ............................ 521/54, 134, 136, 521/137

[56] References Cited

U.S. PATENT DOCUMENTS

| | | | |
|---|---|---|---|
| 3,373,123 | 3/1968 | Brice | 521/54 |
| 3,401,128 | 9/1968 | Terry | 521/54 |
| 3,428,315 | 2/1969 | Haines | 521/54 |
| 3,594,335 | 7/1971 | Schultz et al. | 521/54 |
| 3,894,973 | 7/1975 | Yunan | 521/54 |

FOREIGN PATENT DOCUMENTS

| | | |
|---|---|---|
| 57-045026A | 3/1982 | Japan . |
| 59-083886A | 5/1984 | Japan . |
| 4-275964 | 10/1992 | Japan . |
| 05208182 | 8/1993 | Japan . |
| 5-85629 | 11/1993 | Japan . |
| 06023751A | 2/1994 | Japan . |
| 06087133A | 3/1994 | Japan . |

OTHER PUBLICATIONS

D'Orchel, B. Dubrulle—"Mixed Plastics Recycling"; Plasteurope—Jun., 1993; *the whole document*.

*Primary Examiner*—Morton Foelak
*Attorney, Agent, or Firm*—Joseph C. Mason, Jr.

[57] ABSTRACT

Provided are a reprocessed resin which decreases volume of a thermoset resin foamed material recovered from waste of various resin products and moldably form said thermoset resin foamed material into various molded articles to thereby effectively recover and reprocess the thermoset resin foamed material, a reprocessing method therefor and a method for molding a molded article formed of said reprocessed resin. A pulverized resin to be processed formed of a thermoset resin foamed material along with a thermoplastic resin molding material are applied with a stirring impact force to produce shearing heat generation based on the stirring impact force and are gelled and blended by the shearing heat generation. In this process, the thermoplastic resin molding material is adhered so as to cover the whole surface of the individual pulverized resin to be processed and cooled and granulated to have 15 mm or less of particle diameter to thereby decrease volume by 0.3 or more in bulk specific gravity whereby a reprocessed resin imparting a good flowability is formed to maintain a good blended state at the time of molding such as extrusion molding, injection molding or the like, and a suppressing force is applied to a molded article to increase a density of an extruded material to mold a molded article of uniform and high density.

1 Claim, 9 Drawing Sheets

REPROCESSED RESIN FORMED OF THERMOSET RESIN FORMED MATERIAL, METHOD FOR REPROCESSING THERMOSET RESIN FOAMED MATERIAL AND METHOD FOR MOLDING MOLDED ARTICLE FORMED OF THE REPROCESSED RESIN

BACKGROUND OF THE INVENTION

1. Field of the Invention

The present invention relates to a thermoset resin foamed material, a reprocessed resin formed of a thermoplastic resin molding material and a method for reprocessing the same. More specifically, the present invention relates to a reprocessed resin of raw material pellets or powder used for injection molding or extrusion molding which have been obtained, as raw materials, by granulating and volume-decreasing a thermoset resin foamed material and a thermoplastic resin molding material obtained by recovering waste of resin products (waste resin molded articles) or scraps generated when resin products are molded, a method for reprocessing a thermoset resin foamed material for obtaining said reprocessed resin and a method of molding molded articles formed of said reprocessed resin or a molding stock subjected to the step of further raw-material pelletizing the reprocessed resin.

The thermoset resin foamed materials include, for example, a polyurethane foamed material, a silicone foamed material, a phenol foamed material. Typical urethane foamed materials of the thermoset resin foamed materials include a soft polyurethane foamed material and a hard polyurethane foamed material. The soft polyurethane foamed material is produced as a light-weight foamed material, and 60% out of the total thereof are used for automobiles, the material being contributed to energy saving which saves running fuel and used for cushioning materials such as a seat cushion, a mattress, seats for vehicles and furniture, an underlay for a carpet or rug, a packaging material, an acoustical material, toys, clothes, an air filter and the like. The hard polyurethane foamed material is excellent in performance as a heat insulating material and a structural material and used, for example, for building materials for sound proof and ornament in combination, a heat insulating material for a refrigerator, parts for an aircraft, and the like, contributing to energy saving in various fields. The above materials have the excellent characteristics capable of being foamed at the site and are used as heat insulating coatings for a storage tank vehicle, a vessel, a building, a pipe and the like.

The thermoplastic resin molding material have excellent properties such as being light-weight and durable, easy in molding, beautiful, not rusty, inexpensive and the like, and are therefore used for structural materials such as building material, automobiles, domestic electric appliances, etc., structural materials, for example, such as machineries, devices or boxes, containers, etc. or as ornament materials, and further used in various kinds and in large quantities for a wide application such as clothes, daily necessaries and the like. Various resin products are widely used making the most of excellent properties of the resin stock.

The thermoset resin foamed materials and thermoplastic resin molding materials are discarded in large quantities. Particularly in the thermoset resin foamed material, scraps such as a sprue, a runner, etc. are necessarily by-produced in the injection molding method.

Generally, resin products shaped and molded from resin materials such as various kinds of natural resins or synthetic resins are used in many kinds and in large quantities for internal and external parts of automobiles or the like and domestic electric appliances. However, at present, there are raised various problems as noted below in the processing of the resin products of this kind after use.

It is well known that while many resin materials constituting resin products are excellent in water resistance and weathering resistance and hard to rot, when they are burnt in an incinerator for disposal by discard, for example, a large quantity of noxious gases or smoke-are generated, which is not preferable in social environment. In addition, there is a disadvantage in that the resin material fused during burning is deposited on the oven to possibly damage the oven itself. To avoid this, even if the discarded resin products are embedded in the ground, they still remain without being rotted for long periods, resulting in destruction of environment.

On the other hand, in connection with the resin materials, there is a tendency for draining these materials year by year in resources. It is desired and recognized that the resin materials are reused without discarding them. For the purpose of reuse, an attempt has been made to recover the discarded resin products indicating the kind of the used resin materials.

As for one example, about 75% in weight of materials of an automobile are recycled. Most of them are metal materials, and the remaining materials (about 25%) are discarded as dust. Among them, there includes about 30% in weight ratio of plastics.

For example, as thermoset resin molded articles used for interior and exterior finish work of automobiles, there is a seat cushion which is a lump of a single foamed urethane having a density of 20 to 50 kg/m$^3$. In normal case, it is often that on the surface of a plastic substrate layer is laminated an intermediate layer of a thermoset resin foamed material for enhancing cushioning properties or a plastic surface layer for dressing or for protection for enhancing cushioning properties, wear resistance and weathering resistance. Further, there is a sheet-like resin molded article for the protection as described covering the surface of a molding member to be a core in various resin molded articles. This sheet-like resin molded article is often used in the form such that a surface layer formed of a thermoset resin foamed material is laminated on the surface of a sheet-like substrate layer formed of a dressing or wear resistant and weathering resistant resin for the reason similar to that described in the previous example.

That is, in various interior and exterior finish work parts for automobiles, there is a seat cushion, and in addition, an intermediate layer of a polyurethane foamed material having about 3 to 6 mm of thickness and a surface layer formed from two layers of (poly) vinylchloride having about 0.5 to 1 mm of thickness are laminated on the surface of a substrate layer having about 1 to 2 mm of thickness molded by a polypropylene resin through an adhesive layer. The resin molded article of this kind include a molded article forming an instrument panel (in the present specification, merely referred to as "panel member"), a dashboard, a console box and so on.

In sheet-like resin molded articles as various interior and exterior finish work parts for automobiles, there is an article in which a surface layer formed of a polyurethane foamed material having about 0.4 to 15 mm of thickness is laminated on the surface of a sheet-like substrate layer formed of polyvinylchloride having about 0.5 to 1.5 mm of thickness through an adhesive layer. The sheet-like resin molded article of this kind is used by fixing to the surface of the aforementioned molding member by way of lamination or using stops such as rivets or screws through a tackier or an adhesive covering the surface of the molding member as a core of various molded articles, and is used, for example, for a sheet material for a floor, a sheet material for a seat, a lining sheet material for a door, a skin material for an arm rest, a skin material for a head rest, etc. Generally, in the case of the sheet-like resin molded article, it is often that a surface layer formed of thermoset resin foamed material is placed inside and a sheet-like substrate layer is placed outside to cover the surface of a molding member to be a core of various molded articles.

The urethane foamed material as a thermoset resin foamed material saves mainly a running fuel cost of an automobile as a light-weight foamed material as previously mentioned, and is used as an excellent heat insulating material in a wide field such as a refrigerator, a warehouse, a house, a plant piping, a storage tank, etc. Incidentally, the quantity of polyurethane foamed materials used for an ordinary private car is generally about 30 kg. Moreover, the polyurethane foamed material holds the sixth rank in the production weight of resin materials in 1991 in Japan but holds the second rank in the production amount in volume after molding. Accordingly, in consideration of not only the aforementioned various interior and exterior finish work parts for automobiles but also molded articles offering a convenience in the social life or refuse in living, conversion to volume is important. It is an important task to effectively recycle the thermoset resin foamed materials and to process the discard. Furthermore, in solving this task, it is a very important task to decrease volume of discarded or scrapped thermoset resin foamed materials.

2. Description of the Prior Art

Recycle of scraps or waste of thermoset resin foamed materials in the past will be mentioned giving an example of polyurethane foamed material. In case of soft polyurethane foamed materials, they are recycled as stuffing for cushions obtained by crushing scraps into small pieces or as a cushion material obtained by tightening said small pieces using an adhesive. Alternatively, they are used as a packaging pad in the state as they are. On the other hand, in case of scraps of hard polyurethane foamed materials, they are formed into powder which is used for a plastic filler. Or, they are buried exactly in the form of scraps in the mountains or are burned.

In the past, since waste or scraps of the thermoset resin foamed materials are completely lost in flowability by the setting reaction, even if they are recovered, they cannot be molded independently and recycle thereof is difficult. Under these circumstances, several methods for recycling the polyurethane foamed materials such as material recycle, chemical recycle and energy recycle have been studied.

Adhesive press moldings as the material recycle include a ribbon dead form, an elastic paving material and so on. In the ribbon dead form, a soft polyurethane foamed material is cut and pulverized, and after an adhesive has been coated, the material is inserted into a mold, into which water vapor is introduced, and heated and set at 100° C., and 10 kg/cm$^2$ or 10 minutes, and thence the material is removed from the mold to obtain a ribbon dead form. In the elastic paving material, for example, RIM bumper is pulverized and then molded into a mat-like form to obtain an elastic paving material, which is used for a track and field stadium, a golf course side walk, and a water permeable tennis court. Further, the pulverized product of the RIM bumper is coated with an adhesive and subjected to heat pressing for recycle for an automobile mud guard and the like.

The soft polyurethane foamed material exhibits a semi-thermoplasticity at a high temperature since a degree of crosslinking between molecules is low. Thus, a hot press molding or the like has been proposed.

In the hot press molding, the soft polyurethane foamed material is formed into tips, which are subjected to hot press molding to form a reprocessed sheet. For example, the hot press conditions are that in case of 20 to 100 mm of thickness of a raw foam, a reprocessed sheet of 0.5 (semi-foam) to 1.1 (no-foam) is obtained at 160° to 220° C. and 10 to 300 kg/cm$^2$G in scores of seconds to several minutes.

With respect to use of a filler, in an example in which waste of the soft polyurethane foamed materials is used for a filler, there is a method in which the soft polyurethane foamed material for an automobile seat cushion is finely pulverized into scores of µ by a pulverizer in combination of a low speed rotational roller and a high speed rotational roller, 15 wt % of which is added to resin and reprocessed to obtain a seat cushion.

In an example in which was of the hard polyurethane foamed materials is used for a filler, the hard polyurethane foamed material is pulverized into a filler for cement. The obtained filler is used as an aggregate and mixed with cement, sand and water to provide light-weight mortar for the roof ground which is excellent in processability such as heat insulating setting, light weighting, nailing or the like. Specific gravity after setting is 1.3, which is lighter than 2.6 of the original.

In the chemical recycle, waste of the polyurethane foamed material is decomposed into polyol or polyamine having a low molecular weight by glycosis, aminosis or hydrolyzing and recovered for recycle.

The energy recycle is a method for burning waste or cutting it into suitable size and then burning it to recover energy. The polyurethane foamed material is large in fuel energy and is relatively little in injurious gas. Therefore, the material is burned to recover energy for use with air conditioning.

According to the recycling method for the thermoset resin foamed materials, in the adhesive press molding of the material recycle, when a mixture of a powdered soft polyurethane foamed material and an adhesive is inserted into a mold and subjected to hot pressing, the adhesive is heated and solidified but the powder of the individual soft polyurethane foamed material is not heated and solidified, thus posing a problem in that when the mold is opened, it is expanded and deformed by an elastic force of powder of the individual soft polyurethane foamed material. That is, elastic force properties of powder of the soft polyurethane foamed material differ with a difference in a degree in which the adhesive permeates into powder of the individual soft polyurethane foamed material, and because of this, the material cannot be solidified and molded evenly.

For example, an attempt has been made to produce a molded article by roughly pulverizing 20 wt % of soft polyurethane foamed material of polyurethane foamed material into about 8 mm of size, mixing a urea adhesive into the thus roughly pulverized soft polyurethane foamed material, and pressing the mixture by a hot press to solidify and mold it. The elastic force properties of each soft polyurethane foamed material differ with a difference in a permeating state between the individual soft polyurethane foamed material and the urea adhesive, thus posing a problem in that the material can be pressed evenly.

Further, in the hot press molding of the material recycle, there is a problem in that it is limited to a material such as a soft polyurethane foamed material which is relatively low in a degree of crosslinking between molecules and cannot be applied to a hard polyurethane foamed material.

Moreover, in the past, the recycle method of the hard polyurethane foamed material has been used for a filler but it has been difficult to process into a molded article.

Furthermore, in the case where scraps or waste of the thermoset resin foamed material are burned, there is a problem in that since the thermoset resin foamed material is foamed about 30 times in quantity, the volume is large, handling such as transportation and storage is difficult, and discarding places are gradually limited and lessened.

There is a further problem in that the polyurethane foamed material is melted by about 20% of the total amount at 200° C. and decreased in volume but others remain, thus not resulting in a solution for a discarding disposition.

In the above-described adhesive press molding, the elastic force properties of powder itself of the individual polyurethane foamed material is suppressed by the adhesive so that the material cannot be solidified. Thus, this constitutes no method for decreasing volume of a waste polyurethane foamed material. The hot press molding constitutes no method for decreasing volume of the waste polyurethane foamed material neither.

At present, the chemical recycle constitutes no effective recycling method since there involves various problems noted below.

a. The chemical recycle requires expensive equipment, and an energy consumption amount required by this process is larger than that of the material recycle. Therefore, there is a limit in putting it to practical use.

b. Even if the polyurethane foamed material is pyrolytically decomposed or hydrolyzed, it is necessary to establish a consistent quality management system of a pyrolysis and recovery process from a polyurethane foamed material of waste or scraps to a polyol. Actually, however, there are problems such as unevenness of quality of recovered polyol, selection of raw foams for recovery and coloring of recovered polyol in addition to equipment for the recovery process and other economy.

In the energy recycle, even if the polyurethane foamed material is burned to recover energy, a space for storing the polyurethane foamed materials before being burned is necessary. There is a problem in that since the polyurethane foamed material is foamed by about 30 times in amount as mentioned above, the volume is so large that handling is difficult. Although the polyurethane foamed material is relatively little in generation of injurious gases, processing of injurious components such as burned gases and burned ashes is still necessary. At present, the technology for processing injurious components is under development. Accordingly, unsolved problems still remain in connection with the recycle of thermoset resin foamed material in the field as described.

A primary object of the present invention is to solve the above-described problems and provide a reprocessed resin capable of being reprocessed obtained by recycling various thermoset formed materials and waste or scraps of thermoplastic synthetic resin products, particularly decreasing volume of waste or scraps of thermoset resin foamed materials which have been difficult to be discarded and processed to mold various resin products, a reprocessing method and a method for molding molded articles formed of said reprocessed resin. A further object of the present invention is to provide a reprocessed resin in which recovery and reprocessing of a thermoset resin foamed material can be effectively carried out by decreasing volume of the thermoset resin foamed material recovered from waste of various resin products or scraps generated when various resin products are molded and easily molding said thermoset resin foamed material into various molded articles, a reprocessing method therefor and a method for molding molded articles formed of said reprocessed resin.

SUMMARY OF THE INVENTION

For achieving the aforementioned objects, a reprocessed resin according to the present invention is characterized in that 30 to 80 wt % of thermoplastic resin molding material are mixed with 20 to 70% of pulverized resin to be processed having a heightened bulk specific gravity obtained by pulverizing a thermoset resin foamed material, the mixture is gelled and blended to granulate the material to 15 mm or less of a particle diameter, said thermoplastic resin molding material is fixed to a surface of the pulverized resin to be processed, and said thermoset resin foamed material is decreased in volume.

A reprocessing method according to the present invention comprises at least a pulverizing step of pulverizing a thermoset resin foamed material to form a pulverized resin having a heightened bulk specific gravity, and a step of applying an agitation and impact force in the form of 30 to 80 wt % of thermoplastic resin molding material relative to 20 to 70% of said pulverized resin to be processed to generate shear heat generation based on the agitation impact force, gelling and blending the mixture by said shear heat generation to granulate the material to 15 mm or less of a particle diameter, fixing said thermoplastic resin molding material to a surface of the powder resin to be processed, and decreasing volume of said thermoset resin foamed material.

Preferably, said thermoset resin foamed material is formed of a pulverized resin to be processed having a bulk specific gravity heightened to 0.1 to 0.2, and the bulk specific gravity of the thermoset resin foamed material is decreased in volume to 0.3 or more.

The thermoplastic resin molding material may be formed of a material which recycles other recovered resin material obtained from waste of thermoplastic synthetic resin products, or a material having a virgin thermoplastic resin charged therein, and the virgin thermoplastic resin and said other recovered resin material can be used respectively, for example, by 50%.

The gelling enable range of a pulverized resin to be processed (PUR; polyurethane) formed of urethane foamed material relative to each thermoplastic resin molding material is given below.

In case where the thermoplastic resin forming material is PP (polypropylene):
PUR is 20 to 70 wt %, and a quantity of PP is 30 to 80 wt %, preferably PUR is 40 to 58 wt % and a quantity of PP is 52 to 60 wt %, most preferably PUR is 55 wt % and PP is 45 wt %.

In case where the thermoplastic resin forming material is ABS:
PUR is 30 to 70 wt %, and a quantity of PC is 30 to 70 wt %, preferably PUR is 45 to 65 wt % and a quantity of PC is 35 to 55 wt %, most preferably PUR is 55 wt % and PC is 45 wt %.

In case where the thermoplastic resin forming material is nylon or PVC:
PUR is 30 to 80 wt %, and a quantity of nylon or PVC (polyvinylchloride) is 20 to 70 wt %, preferably PUR is 40 to 70 wt % and a quantity of nylon or PVC is 30 to 60 wt %, most preferably PUR is 45 wt % and nylon or PVC is 55 wt %.

Further, a method for molding a molded article formed of said reprocessed resin comprises at least a step of heating and kneading said reprocessed resin, extruding said resin to a molding die 10 by a screw 71, extruding the extruded material 79 to a molding portion of the molding die 10 having an inner wall surface applied with a fluorine resin sheet or coated with a fluorine resin to mold it to have a predetermined wall-thickness, gradually cooling the material in said molding portion to extrude and mold it, and applying a suppressing force against an extruding force of said molded article to heighten a density of the extruded material 79 within the molding portion.

A further method for molding a molded article according to the present invention comprises a step of heating and kneading said reprocessed resin by means such as known extrusion molding to pelletize the material, injecting the material to a molding die by a screw to mold it to have a predetermined shape of a molded article, gradually cooling the article and removing it from a mold.

The reprocessed resin has a bulk specific gravity about three times or more of that of the thermoset resin foamed material and a volume considerably reduced from that of the thermoset resin foamed material. Therefore, the reprocessed resin can be far easily transported, stored and buried as compared with a lump of a thermoset resin foamed material prior to reprocessing. Further, the reprocessed resin is granulated to 15 mm or less of a particle diameter, but there is formed a configuration that actually a powdered individual pulverized resin to be processed is a mother particle and a thermoplastic resin molding material is a child particle to cover the whole surface of the pulverized resin to be processed. The child particle or the thermoplastic resin molding material forms a so-called crosslinking agent and some pulverized resins to be processed form an assembly for granulation.

Accordingly, in the case where the reprocessed resins are heated and kneaded by an extruder, an injection molding machine or the like, since the thermoplastic resin molding material is fixed to the thermally and chemically stabilized thermoset resin formed material, the mixed dispersed state of the pulverized resin to be processed and the thermoplastic resin molding material is stationarily maintained to obtain a good flowability. As a result, the frictional resistance of the pulverized resin to be processed is reduced and a molded article of even density can be produced from a molding stock of a thermoset resin foamed material.

A thermoset resin foamed material having a thermoplastic resin molding material mixed therein is pulverized by an agitation impact force. The thermoplastic resin molding material is melted by shear heat generation based on the agitation impact force. However, since the thermoset resin foamed material is rarely melted, the thus pulverized resin to be processed and the thermoplastic resin molding material are gelled and blended, the thermoplastic resin molding material is adhered to the whole surface of the individual pulverized resin to be processed, the thermoplastic molding material is formed to be fixed to the thermally and chemically stabilized pulverized resin to be processed, and a reprocessed resin imparting a good flowability is formed so as to stationarily maintain the mixed and dispersed state of the pulverized resin to be processed and the thermoplastic resin molding material. Moreover, the reprocessed resin is considerably decreased in volume to about 14% of that of the thermoset resin foamed material.

A suppressing force is applied by brake means 30 to an extruding force to a molded article 29 applied from an extruder 70, and a drag against said extruding force is applied to an extruding material 79 within a molding chamber 22 through the molded article 29. Then, as compared to the case where no suppressing force is applied to the extruding material 79, the extruding material 79 within the molding chamber 22 will have a more uniform and higher density.

BRIEF DESCRIPTION OF THE DRAWINGS

The objects and advantages of the invention will become understood from the following detailed description of preferred embodiments thereof in connection with the accompanying drawings in which like numerals designate like elements, and, in which.

DETAILED DESCRIPTION OF THE PREFERRED EMBODIMENTS

The embodiment of the present invention will be described hereinafter with reference to the drawings.

A discarded resin molded article as an object is an panel member used for various vehicles. This panel member is that an intermediate layer of a polyurethane foamed material having 5 mm of a thickness and a surface layer of polyvinylchloride having 0.5 mm of thickness are laminated through an adhesive layer on a surface of a substrate layer having 2 mm of thickness molded of a polypropylene resin (PP). More specifically, the substrate layer of PP is a member molded into a shape as desired and constitutes a core material for the panel member. The polyurethane foamed material is laminated on the surface of PP in order to further enhance cushioning properties, and the polyvinylchloride is laminated on the surface of the polyurethane foamed material for dressing or for protection to enhance a wear resistance and a weathering resistance.

Recovery of Thermoset Resing Foamed Material From Panel Member

A method for recovering a thermoset resin foamed material used as a raw material for a reprocesed resin from a discarded resin molding article is not particularly restricted but as an example, a method for separating PP the aforementioned panel member, polyurethane and polyvinylchloride from one another to recover resin materials.

Primary Crushing Step

Figure 1:
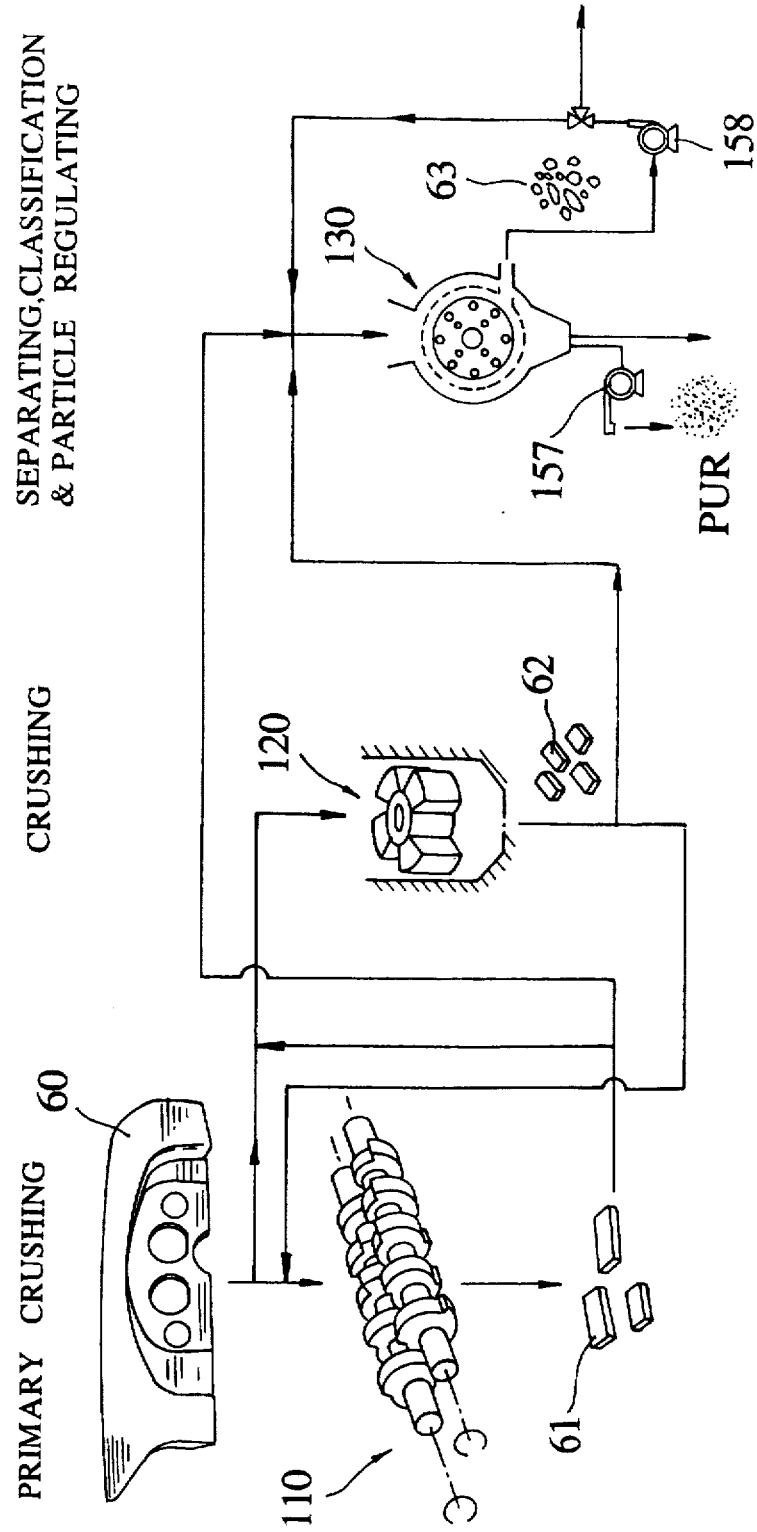
FIG. 1 is a systematic explanatory view of processing steps showing in principle and schematically the outline of an example for recovering a polyurethane foamed material used as a raw material of a reprocessed resin from an panel member of discarded resin molded articles in the embodiment of the present invention.

As shown in FIG. 1, prior to a crushing step (described later) according to a degree of kind, a laminate construction, a shape or size of thermoset resin foamed material or a discarded resin molded article including the former, a primary crushing step for primary crushing using a crusher 11 (referred to as "crusher" for the sake of convenience in the present specification) shown hereinafter to form primary crushed pieces having a suitable size can be carried out. Alternatively, a pulverized resin to be processed can be obtained merely by crushing by a cutter mill or primary crushing step. Further, crushing can be made in a reversed order between crushing by a cutter mill or pulverizing step and a primary crushing step by a crusher. Or, crushing or pulverization by a crusher can be also made omitting a step to be accomplished by a cutter mill.

Crushers include primary crushing means such as various monocutters, shredders, crushers or the like such as a Guinacks crusher manufactured by Horai Ltd. or a roll crusher manufactured by Nara Kikai Seisakusho Ltd. As for one example, two inwardly rotating shafts are provided in parallel with each other within a crusher body having a charging opening of material to be primary crushed at an upper part thereof as shown in FIG. 1, a plurality of rotary edges are provided in a predetermined spaced relation on each of the shafts, and collected material to be primary crushed are cut into primary crushed pieces formed of fragments of suitable size by three pawl edges meshed with each other in the periphery of each rotary edge of each of the shafts and projected so as to form an equal angle to the outer peripheral surface of each of the rotary edges. When the panel member is charged through the upper charging opening, an panel member 60 is inwardly drawn by the pawl edges of the rotary edges of the two shafts which rotate inwardly each other, and the panel member is primary crushed and cut by a compression force to be exerted when drawing while slitting it by a continuously exerting shearing force between the outer peripheral edges of the rotary edges which rotate in the meshed state to form primary crushed pieces 61. This primary crushed piece is discharged through a discharge opening provided below the rotary edges of the two shafts.

Crushing Step

The panel member 60 formed into the primary crushed pieces 61 in the aforementioned step is cut or crushed in a broad sense into fragments of suitable size using crushing means as shown in FIG. 1 to form a crushed piece of size in which one side is 2×2 mm or less in the form, for example, of a rectangle or square or other indefinite shapes.

Figure 2:
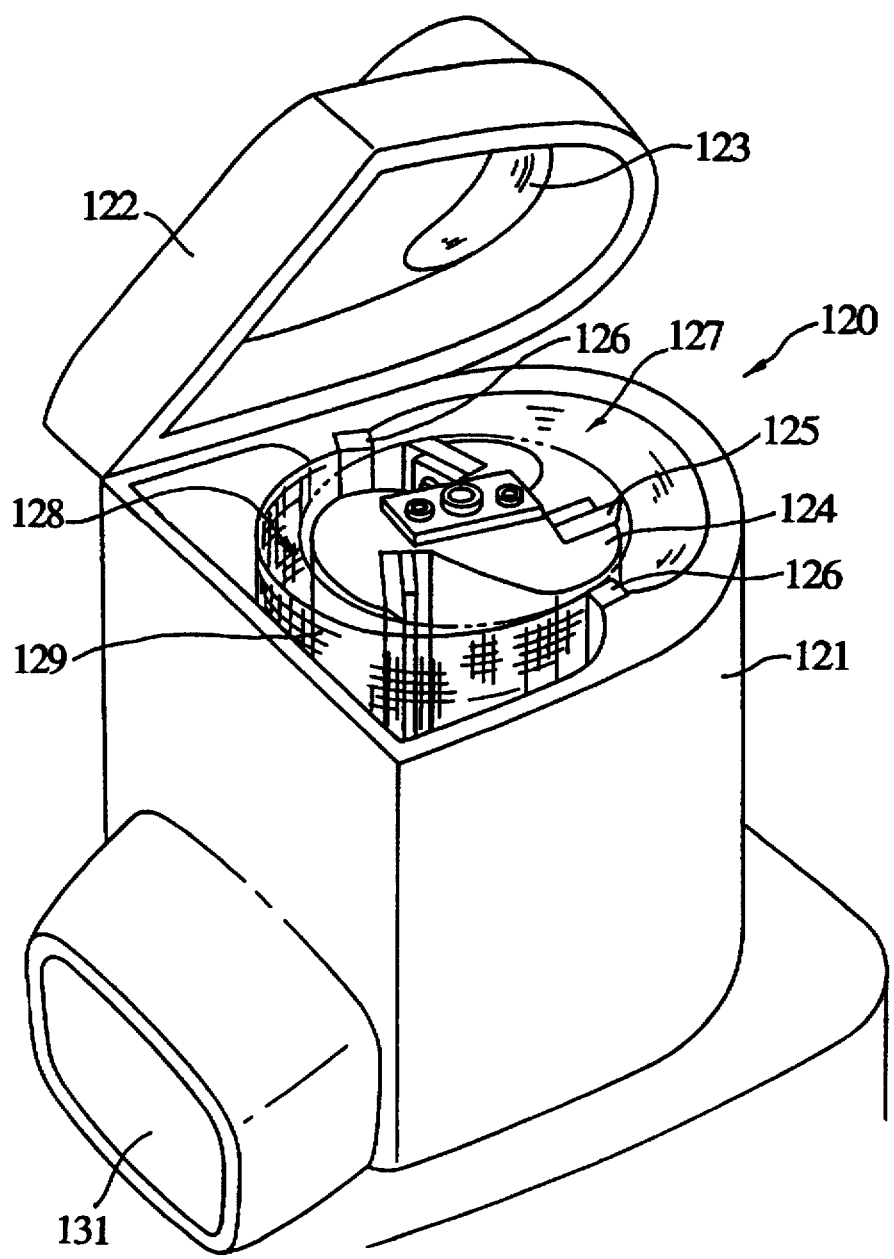
FIG. 2 is an entire perspective view showing essential parts of a cutter mill (pulverizing means) used in the above embodiment.

FIG. 2 shows a cutter mill 120 as an example of crushing means.

Reference numeral 121 designates a cutter mill body, which is a cylindrical casing having an upper opening, said opening being covered by a closable lid 122. The lid 122 is provided with a charging opening 123 for charging the panel member 6 in the form of primary crushed pieces 61 as a material to be processed into the cutter mill body 121.

Further, the cutter mill body 121 is interiorly provided with a cutter support body 124 which is supported on the bottom surface of the cutter mill body 121 and rotated in a horizontal direction by rotative drive means not shown. The cutter support body 124 is provided in the outer periphery with three vertically long rotary edges 125, which are disposed so as to form an equal angle of 120 degrees in the rotating direction of the cutter support body 124, said three rotary edges 125 having knife edges positioned on one and the same rotating locus. Two fixed edges 126 are secured to the cutter mill body 121 substantially at symmetrical position of the rotating locus of the knife edges of the rotary edges 125 through a slight clearance with respect to the rotating locus of the knife edges of the three rotary edges 125. The cutter mill body 121 is divided into two sections by the two fixed edges 126, the cutter support body 124 and the rotary edges 125 to form a charging chamber 127 and a crushing chamber 128. The charging opening 123 of the lid 122 is communicated with the charging chamber 127. The clearance between the two fixed edges 126 and the rotary edges 125 can be freely adjusted so that the material to be crushed may be cut or crushed in a broad sense into a desired size. This clearance is 0.2 to 0.3 mm. The crushing chamber is divided between the two fixed edges 126 by a mesh screen 129 so as to surround the rotating locus of the rotary edges 25. The screen 129 is formed by meshes through which the crushed piece 62 of size in which one side is about 5 mm may pass. A discharge opening for discharging the crushed pieces 62 is provided at the lower end of the cutter mill 121 of the crushing chamber 128.

In the above-described cutter mill 120, when the primary crushed pieces 61 are charged through the charging opening 123 of the lid 122 and the cutter support body 124 is rotated by rotative drive means not shown, the primary crushed pieces 61 in substantially total quantity are formed into the crushed pieces 62 which are rectangle or square or indefinite shape and a square of size in which one side is 2 mm or less though shape and area are indefinite via the screen 129 between the rotary edges 125 of the cutter support body 124 and the fixed edges 126 and discharged through the discharge opening to the next step. In each of the crushed pieces 62, the whole or a part of an intermediate layer or a surface layer is laminated on the surface of a substrate layer. That is, they are crushed in various states such as a material comprising PP, a polyurethane foamed material and polyvinylchloride, a material comprising PP and a polyurethane foamed material (one from which polyvinylchloride is separated or one from which a part of a polyurethane foamed material and polyvinyl chloride are separated) or one in which an adhesive layer remains on the surface of PP. Each of the crushed pieces 62 is basically in the state where the polyurethane foamed material and polyvinylchloride are not separated from PP.

It is to be noted that the crushing means is not limited to the above-described cutter mill but there is one, for example as in a hard crusher manufactured by Horai Ltd., in which a rotational shaft of the rotary edge 25 is provided horizontally and the screen 129 between the two fixed edges 126 is provided at a lower part.

Separating, Classifying and Particle-Regulating Step

In the separating, classifying and particle-regulating step, an impact, compression and attrition force is added to the crushed piece 62 crushed by the crushing means in the aforementioned crushing step using separating, classifying and particle-regulating means described later to apply impact and compression action thereto to granulate the pieces. From the crushed piece 62, PP as a substrate layer is granulated and particle-regulated into size which is substantially spherical having about 1.5 to 3 mm of diameter or columnar having about 1 to 2 mm of diameter and 3 to 5 mm of length or other indefinite shapes. At the same time, the impact and compression action is applied to the crushed piece 62 by the impact, compression and attrition force, and the polyurethane foamed material of the crushed piece 62 and polyvinylchloride are separated from PP and pulverized. The particle-regulated polyurethane, polyvinylchloride and PP are classified, and polyvinylchloride, polyurethane and PP are recovered as pulverized resins to be processed or other resin materials to be recovered.

The above-described step can be repetitively carried out in suitable times as necessary.

Separating, Classifying and Particle-Regulating Means

The separating, classifying and particle-regulating means is called a "separator" for the convenience's sake.

Figure 3:
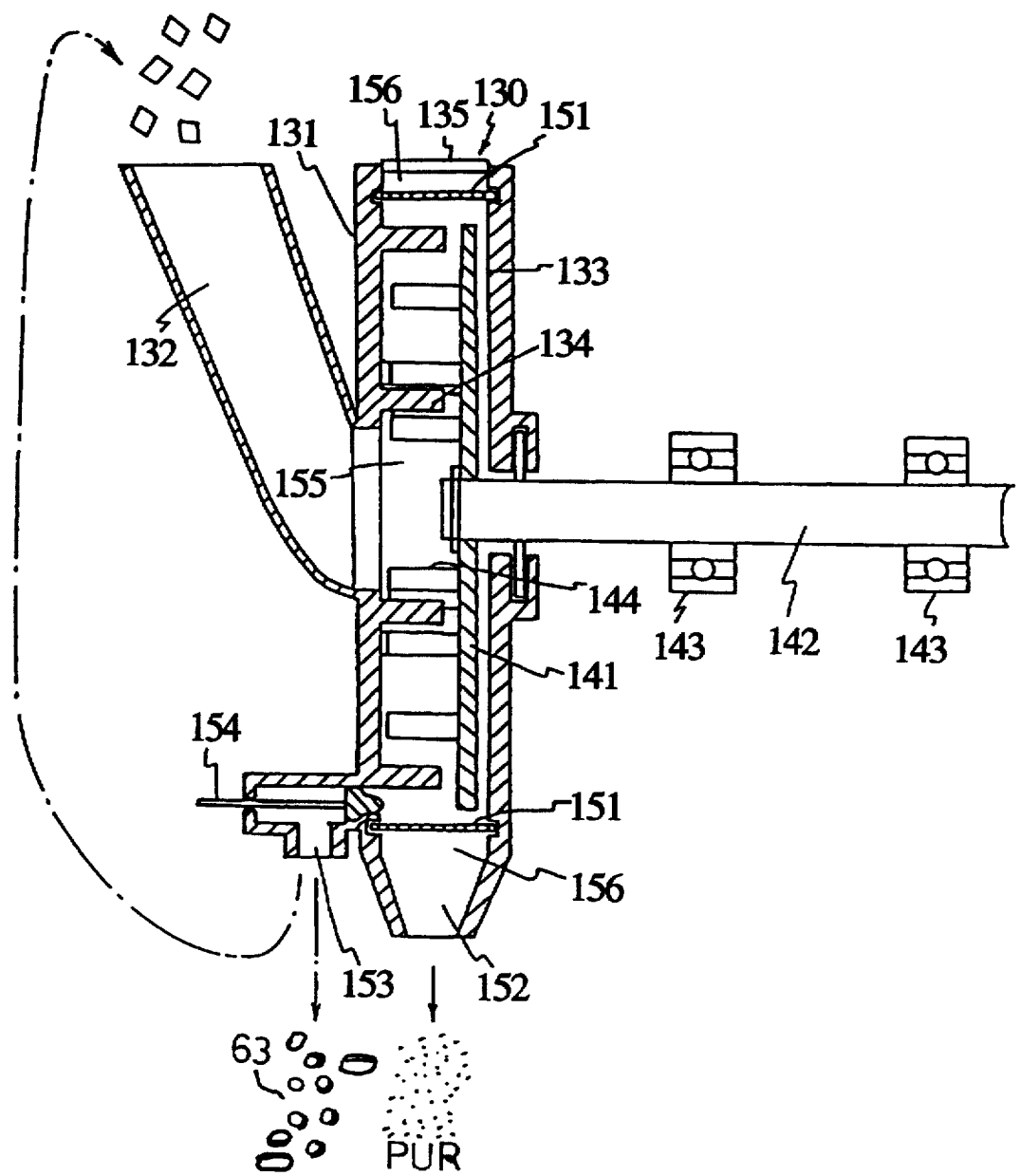
FIG. 3 is a longitudinal sectional view schematically showing a rough constitution of separating, classifying and particle-regulating means (separator) used in the above embodiment.
Figure 4:
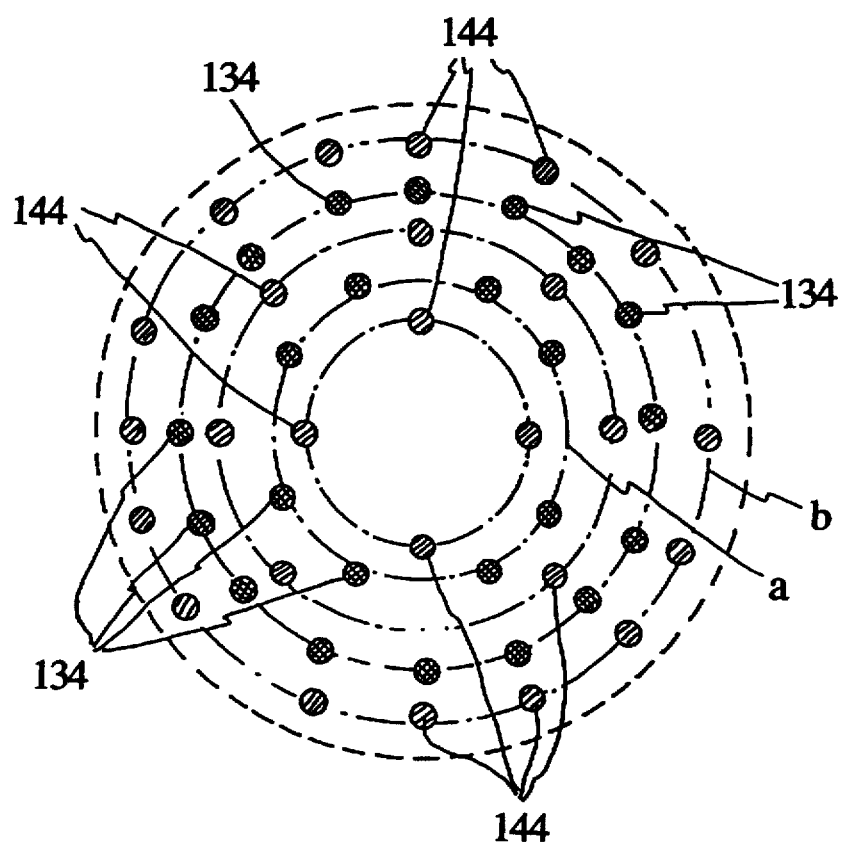
FIG. 4 is a front view for explaining the separating, classifying and particle-regulating operations in FIG. 3.

In FIGS. 3 and 4, in a separator 130, a supply and charging opening 132 for charging crushed pieces 62 is brought into communication with and opened to a center portion of a fixed disk 131, a fixed end plate 133 is opposed to the fixed disk 131 at intervals of a pulverizing and particle-regulating space 155, and an outer end edge of the fixed end plate 133 is secured to the fixed disk 131 by a peripheral side plate 135. A movable disk 141 driven by a rotational lateral shaft 142 is provided within the pulverizing and particle-regulating space 155, said rotational lateral shaft 142 being supported by bearings 143 and 143. The rotational lateral shaft 142 is rotated by rotational drive means such as a motor not shown.

Fixed pins 134 are sequentially set, on a rotational locus marked a (relative to the movable disk 141) (FIG. 4) on a plurality of concentric circles, on the fixed disk 131 whereas alternate movable pins 144 on a plurality of rotational locus marked b different from the fixed pins 134, on the movable disk 141 with a clearance provided between the pins 134 and 134 so as to obtain the impact, compression, pulverization and particle-regulating action by the impact, compression and attrition force between the fixed and movable pins 134 and 135. A predetermined meshed screen 151 having narrow holes having a desired diameter formed at intervals of a discharge space 156 is provided between the peripheral side plates 135 in the outer peripheral side of the movable disk 141, and a discharge opening 152 is provided below the discharge space 156. In the discharge opening 152, a blower 157 is communicated with a separator 130 as shown in FIG. 1. In the present embodiment, the screen 151 has meshes having 2 mm of diameter.

A take-out opening 153 is provided at a lower part within the screen 151 of the pulverizing and particle-regulating space 155, and a plug valve 154 for the control of opening and closing is disposed at the take-out opening 153. A blower 188 for sucking air within the separator 130 is communicated with the take-out opening 153 as shown in FIG. 1, being communicated with the supply and charging opening 132 through the blower 158.

Accordingly, in the separator 130, when the rotational lateral shaft 142 is rotated by rotational drive means not shown to supply the crushed pieces 62 into the supply and charging opening 132, the crushed pieces 62 are subjected to the impact, compression and pulverization or the polishing and particle-regulating action and centrifugal action in combination by the impact, compression and attrition force between the fixed and movable pins 134 and 144 in the center portion of the crushing and particle-regulating space 155, whereby crushed pieces are crushed by the impact and compression action through the stronger impact, compression and attrition force since the peripheral speed of the movable pins 144 in the outer peripheral portion increases as peripheral rows increase while being scattered in the outer peripheral direction. In this process, the polyurethane (PUR) and polyvinylchloride (PVC) laminated on the surface of PP of the crushed pieces 62 are finely pulverized into an indefinite shape whose one size is 1.5 mm or less whereas PP and PVC are crushed, polished and particle-regulated into a substantially spherical shape having 1.5 to 3 mm of diameter, a columnar shape having about 1 to 2 mm of diameter of 3 to 5 mm of length or other indefinite shapes so that other recovered resin material 63 is formed, and the polyurethane and polyvinylchloride are separated from PP. Some of a part of PP of the crushed pieces 62 are formed into powder in which one side is crushed into size of an indefinite shape of 1.5 mm or less. As the case may be, the polyurethane and polyvinylchloride cannot be separated from PP merely by the single processing step by way of a separator but the polyurethane and polyvinylchloride remain on the surface of PP. Polyurethane or polyvinylchloride having the size that does not pass through the screen 151 is sometimes present in a mixed state.

The crushed polyurethane (and a part of a fine amount of polyvinylchloride and PP, as the case may be) passes through the screen 151 by the centrifugal action of the movable pins 144 and is classified within the discharge space 156, after which it is sucked and discharged via the blower 157 (FIG. 1) from the discharge opening and classified and recovered in the succeeding step.

On the other hand, the recovered resin material 63 of the particle-regulated PP and the polyurethane or polyvinylchloride having a size which does not pass through the screen 15 remain within the screen 151. However, since the take-out opening 153 is communicated with the supply and charging opening 132 through the blower 158 in the state with the plug valve 154 opened, the recovered resin material 63 of PP and a fine amount of polyurethane or polyvinylchloride whose one side is larger than 1.5 mm of average particle size are refluxed to the supply and charging opening 132 and are again subjected to the impact, compression and attrition force and crushed or polished and particle-regulated. The polyurethane or polyvinylchloride remaining on the surface of PP are crushed so that they may pass through the screen 151 and separated from PP and thence discharged outside from the discharge opening 152 as mentioned above. Since the recovered resin material 63 of PP is refluxed but is not so finely crushed so that it may pass through the screen 151, a greater portion thereof remains within the screen 51 and is removed as the recovered resin material from the take-out opening 153 by opening the plug valve 154. The above-described separating, classifying and particle-regulating step can be repeated in plural times as necessary.

The polyurethane, a fine amount of polyvinylchloride and PP discharged out of the discharge opening 152 passing through the screen 151 are classified by classifying means such as a centrifugal classifier by way of air or water making use of a difference of specific gravity as necessary and recovered as pulverized resins to be processed or other recovered resin materials.

While in the aforementioned embodiment, the panel member is used as a discarded resin molded article to be recovered, it is to be noted that also in the case where sheet-like resin molded articles and other resin products applied to various vehicles are used as discarded resin molded articles to be recovered and a substrate layer is a resin product formed, for example, of an ABS resin, polyethylene, polycarbonate, polyvinylchloride, polystyrene or the like, a thermoset resin foamed material can be separated and various resin materials can be recovered as pulverized resins to be processed or other recovered resin materials in a manner similar to the above.

A bulk specific gravity of the polyurethane foamed material recovered from the panel is 0.118 but that of the pulverized resin to be processed of polyurethane in the above step was 0.140.

Crushing of seat cushion

A polyurethane foamed material which constitutes a seat cushion with a plastic seat or a surface layer formed of leather or the like and a spring removed from a seat of an automobile is recovered as a pulverized resin to be processed in this step via the primary crushing step (not via the separating and classifying step) as necessary.

The above polyurethane foamed material is pulverized into an indefinite shape such as a cubic, a rectangular parallelopiped or a spherical body, a column or the like whose one side is about 2×2 mm by pulverizing means such as a cutter mill. A bulk specific gravity of the polyurethane foamed material recovered from the seat cushion is 0.028 but that of the pulverized resin to be processed of polyurethane in the above step was 0.153.

The bulk specific gravity in the present specification is a loose bulk specific gravity, which is indicated by a numerical value obtained by putting the aforementioned material into a container of 100 cc in a heaping state, cutting it by rubbing and dividing a total weight of the material in the container by 100.

Reprocessed resin using a thermoset resin foamed material

In the present embodiment, the polyurethane foamed material which is the thermoset foamed material pulverized into a predetermined particle diameter or less recovered from the panel member and PP (polypropylene) of the thermoplastic resin molding material recovered from the panel member of other resin molded articles or virgin PP are used as raw material for the reprocessed resin.

Outline of step for producing reprocessed resin

The outline of step of producing a reprocessed resin according to the present invention will be described hereinafter.

a. PP together with a pulverized resin to be processed are charged into flow mixing and blending means and mixer 80, and the PP and polyurethane within the mixer 80 are gelled and blended to form a "blended material". The blended material is sent to a cleaning mixer 100. A true specific gravity of PP is 0.92.

b. The blended material is completely cooled and granulated within the cleaning mixer 100 to form a granulated "reprocessed resin" having 15 mm or less of diameter.

c. The reprocessed resin is suck by a blower and fed to a cyclone, within which cyclone dust and reprocessed resin are classified. The dust is sent to a dust collector while the reprocessed resin is fed to and stored in a storage tank provided below the cyclone.

When a granulated raw material in which the blended material discharged out of the mixer 80 is a lump of about 100 to 150 mm is present, it is desired that the former is crushed by a crusher as necessary. The crushed blended material is sucked by a blower and fed to a cyclone, within which cyclone dust and blended material are classified. The dust is fed to a dust collector while the blended material can be fed from the cyclone to the cooling mixer 100.

The above-described main producing steps include a step of pulverizing a thermoset resin within the mixer 80 as flow mixing and blending means and a gelling and blending step for a thermoset resin and a thermoplastic resin molding material, and others may be added or omitted as necessary.

Details of step for producing a reprocessed resin

The above-described main producing steps and an embodiment of apparatuses used in these producing steps will be described hereinafter with reference to the drawings.

The production of the reprocessed resin according to the present invention is carried out in the following procedure.

Figure 5:
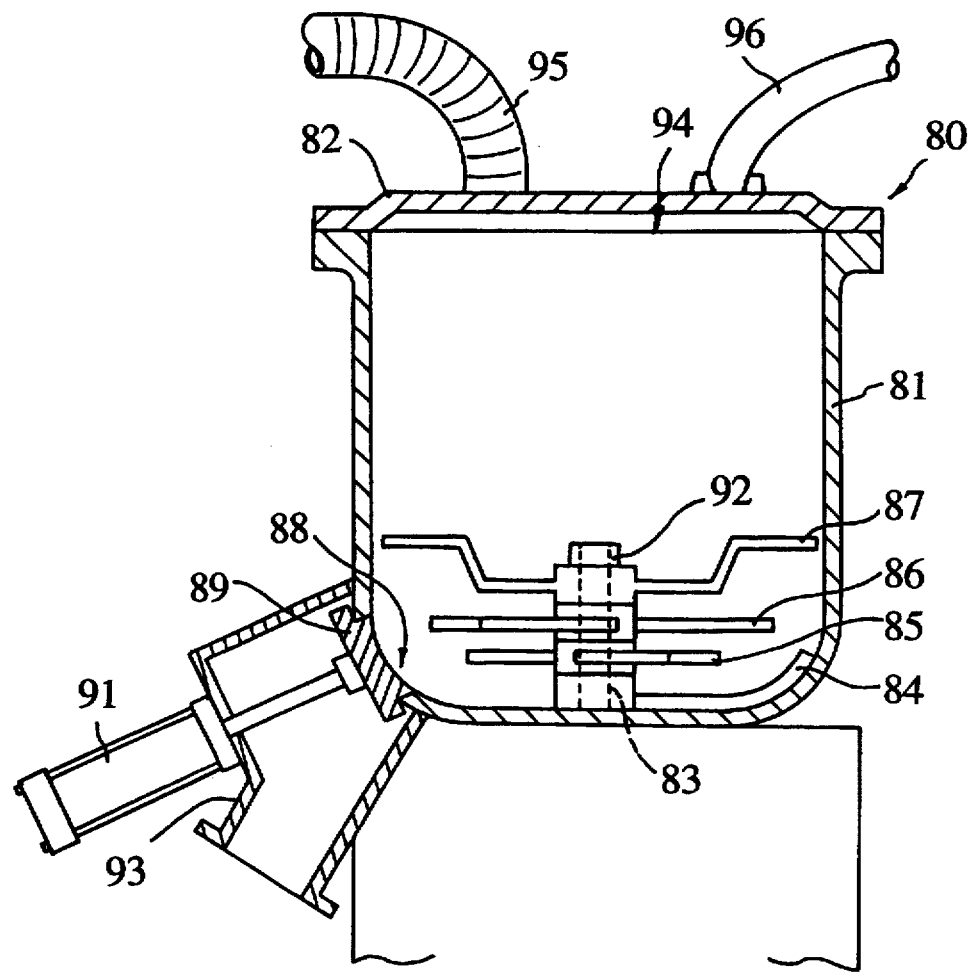
FIG. 5 is an entire front view showing in section essential parts of a mixer (pulverizing means and flow, mixing and blending means) used in the above embodiment of the present invention.
Figure 6:
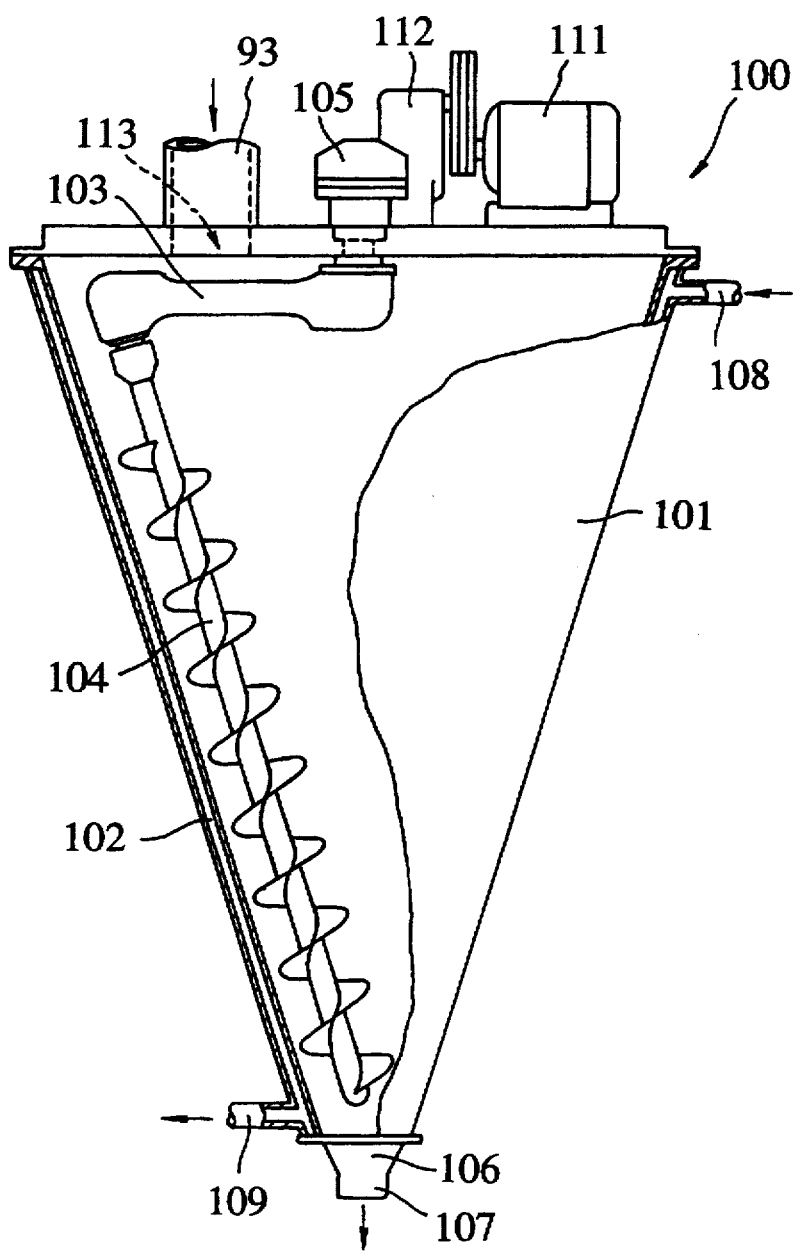
FIG. 6 is an entire front view showing in section essential parts of a cleaning mixer (cooling and granulating means) used in the above embodiment of the present invention.

In FIG. 5, reference numeral 80 designates pulverizing means and flow mixing and blending means for a thermoset resin foamed material and being called a "mixer" for the convenience's sake.

Reference numeral 81 designates a casing whose capacity is 300 liter which is cylindrical having an upper opening which is a charging opening 94 for charging a pulverized resin to be processed of a raw thermoset resin into the mixer body 81, said charging opening 94 being covered by a closable upper lid 82. The upper lid 82 is communicated with a feed pipe 96 for supplying dried air and communicated with an exhaust pipe 95 for discharging a large amount of volatile gases such as water vapor generated from the pulverized resin to be processed within the mixer body 81. Further, a discharge opening 88 is provided in the outer peripheral surface in the vicinity of the bottom surface of the mixer body 81 and a lid 89 for covering the discharge opening 88 is provided at the extreme end of a rod of a cylinder 91, said discharge opening 88 being opened and closed by the operation of the cylinder 91. Reference numeral 93 designates an exhaust duct, which is communicated with the discharge opening 88.

Further, a shaft 83 which is rotated at high speed by rotating drive means such as a motor not shown having 37 kw (DC) horse power is supported upwardly within the mixer body 81 in the center of the bottom surface of the mixer body 81. A scraper 84, stirring impact vanes 85, 86 and 87 are mounted on the shaft 83 in order from bottom to top and fastened by a fastening nut 92 from the extreme end of the shaft 83. While the shape of the stirring impact vanes 85, 86 and 87 is not particularly limited, it is to be noted that in the present embodiment, the vanes are of a two-blade which is symmetrical about the shaft 83. In the case where three pairs of stirring impact vanes are placed one upon another, as shown in FIG. 5, there are six blades in total. These six blades are placed one upon another in the state where they cross one another so as to form an equally divided angle (60 degrees) obtained by dividing 360 degrees by six (6) in the plane. In the case where a plurality of stirring impact vanes are provided, it is preferred in effectively blending raw materials that the blades are placed one upon another while being crossed at an angle obtained by equally dividing 360 degrees by the number of the total stirring impact vanes.

The shape of the uppermost stirring impact vane 87 is of a shape in which an extreme end portion of the two-blade is bended so as to be higher than a portion to be mounted on the shaft 83, said extreme end portion being arranged at a position higher than the extreme end of the shaft 83. With this, the shearing force by way of the stirring impact vane 87 can be applied to the upper layer portion of the pulverized resin to be processed charged into the mixer 80. This shape is preferred in terms of the fact that the pulverized resin to be processed is efficiently pulverized and dried.

The scraper 84 rotates slightly in frictional contact with the bottom surface of the mixer body 81 to scrape and circulate upward the raw material within the mixer body so that the material does not stay on the bottom surface and to scrape the processed raw material so that the material does not stay on the bottom surface of the mixer body 81.

Example of production of reprocessed resin

The pulverized resin to be processed together with PP as a thermoplastic resin molding material are charged into the mixer 80 and gelled and blended by the mixer 80 serving as the flow mixing and blending means to form a reprocessed resin. This will be described in detail hereinafter.

The motor for the mixer 80 is driven to rotate the stirring impact vanes 85, 86 and 87 and the scraper 84 at high speeds of 900 rpm, and the upper lid 82 of the mixer 80 is opened to charge the pulverized resin to be process and the thermoplastic resin molding material into the mixer body 80 from a charging opening 94.

The stirring impact vanes 85, 86 and 87 and the scraper 84 are rotated at rotational speeds of 900 rpm to stir the raw materials.

Further, it is possible to supply dried air (pressure: 0.5 kg/cm$^2$) from a dried air supply source formed from a compressor provided with a dehumidifier or a blower not shown through a feed pipe 96 into the mixer body 81. Volatile gas is contained in the dried air and discharged from an exhaust pipe 95 and thence sucked into a dust collector by means of a blower not shown.

In the case where the shearing speed of the stirring impact vanes is too high, the pulverized resin to be processed is flied up by the centrifugal force of the stirring impact vanes to lower the mixing effect, and in the case where the shearing speed is too low, a generation amount of shearing heat generation caused by the shearing force of the stirring impact vanes is small to lower the drying efficiency and the pulverizing efficiency. For this reason, the shearing speed is preferably 800 to 950 rpm, more preferably 850 to 900 rpm.

Further, in the present invention, the number of the stirring impact vanes is six in total of the stirring impact vanes 85, 86 and 87, and seven in total including the scraper 84, as mentioned above. When for example, the number of a pair of the stirring impact vanes 85 and the scraper 84 is three in total, a generation amount of shearing heat generation caused by the shearing force of the stirring impact vanes is small. For this reason, preferably the number is five or more including the scraper 84, more preferably seven or more including the scraper 84.

As described above, 26.4 kg (55 wt %) of the pulverized resin to be processed and 21.6 kg (45 wt %) of PP powder as the thermoplastic resin molding material are charged into the mixer body 81, and 48 kg in total of polyurethane an PP are blended at the shearing speed of 900 rpm of the stirring impact vanes. In the present embodiment, the form of PP is that a mixture of 50 wt % of a virgin pellet and 50 wt % of PP recovered from the panel member is used. Incidentally, a bulk specific gravity of the pulverized resin to be processed is 0.140, and that of PP is 0.54.

Since the rotational speed or the shearing speed of the stirring impact vanes is high at 900 rpm, the shearing force of the stirring impact vanes 85, 86 and 87 is high. Therefore, the pulverized resin to be processed within the mixer 80 is impacted and ruptured into powder. An amount of heat generation of frictional heat caused by friction between the stirring impact vanes and the pulverized resin to be processed, between the pulverized resins to be processed or between PP of the thermoplastic resin molding material, that is, the shearing heat generation enhances, and the temperature in the mixer 80 rises. With the rise of the temperature in the mixer 80, the temperature in the mixer body 80 was 200° C.

A melting point of PP is 170° to 200° C. Since the pulverized resin to be processed is a thermoset resin, it is not melted. In this step, therefore, PP will not be a large lump due to the presence of the pulverized resin to be processed within the raw material, and in mixing and dispersion, they are not coalesced but gelled into clay. In this step, the clay-like gelled material became a lumpy blended material having 10 to 100 mm of diameter. This blended material is formed in the state of individual pulverized resin to be processed where a thermoplastic resin is adhered to the whole surface of a single pulverized resin to be processed, and the pulverized resin to be processed will be a form covered by PP.

Discharge of blended material

The motor for the mixer 80 is driven at low speeds of 400 to 450 rpm, and the cylinder 91 is operated to retreat the lid 89 to open the discharge opening 88. The gelled raw material within the mixer body 80 is scraped out of the discharge opening 88 by the scraper 84 which rotates at low speeds, and discharged to the succeeding step through a discharge duct 93. A temperature at the time of discharge is 190° C. It takes 12 minutes from the charging of the pulverized resin to be processed and PP to the discharge, and they are formed into powder having a predetermined particle diameter in the cooling and graduating step described later.

d. Cooling and granulation

The blended material formed in the mixer 80 is charged into the mixer body 101 in the inverted-conical shape from a charging opening 113 of the cleaning mixer 100 via the discharge duct 93. An arm 103 supported substantially in the center within the upper wall of the mixer body 101 is horizontally rotated at a speed of 3 rpm by a motor 111 through a reduction gear 112. A screw type stirring impact vane 103 is supported at the extreme end of the arm 103. The rotational axis of the stirring impact vane 104 extends near the lower end of the mixer body 101 downward substantially parallel along the inner peripheral wall surface of the mixer body 101. The stirring impact vane 104 is connected to a rotational shaft connected to an output shaft of the motor 105 through rotation transmission means such as a gear provided within the arm 103, and rotates at a speed of 90 rpm. The stirring impact vane 104 rotates so as to depict a cone along the inner peripheral wall surface of the mixer body 101 to stir the blended material within the arm 103.

Cooling water is always supplied from a water pipe 108 to a drain pipe 109 within a jacket 102 formed within the outer peripheral wall of the mixer body 101. The blended material stirred by the stirring impact vane 104 is cooled to a melting point or so of PP in the inner peripheral surface of the mixer body 101 cooled by the cooling water within the jacket 102 to form a reprocessed resin granulated into about 15 mm or less of diameter. The reprocessed resin is discharged out of a discharge opening 107 by opening a valve 106.

A melting point of PP is 170° to 200° C. In the present example of production, the blended material gelled to 185° to 210° C. within the mixer 80 is cooled to 58° to 100° C. in 15 minutes after being charged into the cooling mixer 100 and is efficiently cooled and granulated by the cooling mixer. With respect to the cooling water within the jacket 102, a temperature of cooling water supplied from a water pipe 108 is 16° C., and a temperature of cooling water discharged out of a drain pipe 108 is 35° C.

Preferably, the blended material is cooled to a level less than a coagulating point or a melting point of the thermoplastic resin molding material. However, since it is mixed with the pulverized resin to be processed of polyurethane, it is not necessary to lower than the melting point of the thermoplastic resin molding material. Actually, the blended material may be cooled to a temperature such that the reprocessed resin can be discharged out of the discharge opening 107.

The cooling and granulating means is not limited to a device such as the aforementioned cooling mixer but may be a device in which a stirring blade for stirring the blended material within the mixer body is provided and a jacket as described above is provided on the outer peripheral wall surface of the mixer body so that the blended material within the mixer body is cooled by cooling water which flows into the jacket.

The blended material formed by the mixer 80 can be cooled merely by the stirring using a conventional mixer not provided with the jacket 102. However, it is desirable to use the cooling mixer as in the present embodiment in terms of efficient cooling.

In the reprocessed resin obtained as described above, an individual single pulverized resin to be processed is a mother particle and pulverized powder of PP is a child particle. The whole surface of the pulverized resin to be processed is covered with PP. The PP as the child particle constitutes a so-called crosslinking agent and some pulverized resins to be processed form an assembly, which is granulated to 15 mm or less of diameter. The urethane foamed material itself is not good in flowability but the circumference of the pulverized resin to be processed is covered with PP which is good in flowability. Therefore, the reprocessed resin becomes a molded stock which exhibits a good flowability when molded by extrusion molding or injection molding.

A bulk specific gravity of the obtained reprocessed resin was 0.439. Accordingly, since the bulk specific gravity of the product prior to recovery was 0.118, the reprocessed resin according to the present invention considerably reduces in volume to about 27%, thus enabling extremely effective decrease in volume.

While the aforementioned embodiment, a description has been made of the polyurethane foamed material as the thermoset resin foamed material as a main example, it is to be noted that a phenol foamed material, a silicone foamed material and the like formed of a stock of thermoset resin foamed material obtained by being recovered from other discarded various resin molded articles can be used.

Further, while PP has been described as a main example for the thermoplastic resin molding material, it is to be noted that one of resins such as an ABS resin, polystyrene, PE (polyethylene), PVC (polyvinylchloride), PC (polycarbonate), nylon and the like or a mixture of them formed of a stock of the thermoplastic resin molding material for thermoplastic resins obtained by being recovered from other discarded various resin molded articles can be used.

Example of production of molded articles using reprocessed resin

The reprocessed resin is charged into the molding machine and heated to mold articles by various molding methods. Alternatively, the reprocessed resin is mixed with the aforesaid other recovered resin materials or the thermoplastic resin. Or the recessed resin is singly or together with the aforementioned other recovered resin materials molded by the known extrusion molding. Or the raw material pellet as a molding stock such as a compound is charged into the molding machine used for various molding methods such as injection molding, extrusion molding, compression molding or the like, and heated and blended to produce molded articles by various molding methods.

Example of production of molded articles by injection molding

An example of production of molded articles of various panels for automobiles molded by injection molding using the reprocessed resin according to the present invention will be described.

A polyurethane foamed material and a raw material pellet formed of reprocessed resin formed of PP are charged as molding materials into a hopper of a lateral type injection molding machine. The reprocessed resin is fed into a heating cylinder in connection with a reciprocating motion of an injection ram from the hopper. The resin is heated and kneaded within the heating cylinder to become softened and provide a phlebolith. The kneaded material is extruded by a plunger into a mold cavity by the injection ram. That is, the material passes through a nozzle at one end of the heating cylinder, is injected into the mold cavity from a gate of the mold via a sprue of the mold, and is gradually cooled, after which the material is removed from the mold to provide a molded article for a body panel. The operations such as the reciprocating motion of the injection ram, the opening and closing of the mold and the like are fully automated. The injection ram is repetitively operated by automatic operation to repetitively perform the operation of the above-described injection molding step to produce in volume of body panels.

Example of production of molded articles by extrusion molding

An example of production of molded plates molded by extrusion molding using the reprocessed resin according to the present invention will be described below.

The reprocessed resin is charged into a hopper 73 of an extruding machine 70. The resin is heated and blended within the extruding machine 70, is discharged out of an extrusion die 77 to a molding die 10, and is molded into a molding plate by the molding die 10.

Figure 7:
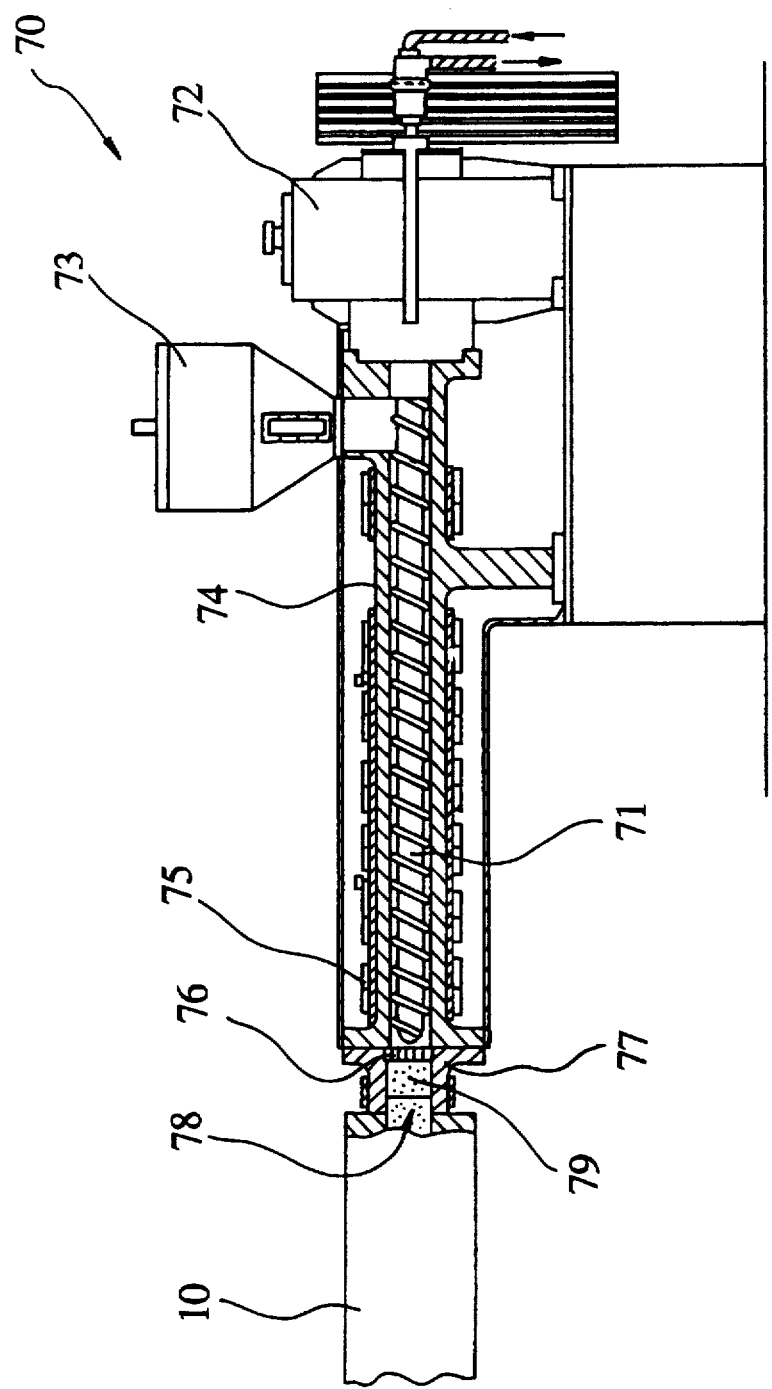
FIG. 7 is an entire front view showing in section essential parts of an extruder used in the above embodiment of the present invention.

In FIG. 7, reference numeral 70 designates a single shaft extruding machine. Generally, the extruding machine is of a screw type as shown. There are a single shaft extruding machine, a multi-shaft extruding machine, a modification thereof and a combination of them. As the extruding machine according to the present invention, any of above-described constructions can be used. Reference numeral 71 designates a screw, which is of a single shaft type in the present embodiment.

The screw 71 is driven by a motor through a gear reduction device 72 and rotates within a barrel 74. The reprocessed resin charged from the hopper 73 by the rotating screw 71 is extruded forwardly of the screw 71 while being blended. A band heater 5 is provided on the outer surface of the barrel 74. Polyurethane and PP of the reprocessed resin, namely, the pulverized resin to be processed are heated to 180° C. by the band heater 7 and transported forwardly along the groove of the screw 71. PP is gradually melted and PP around the pulverized resin to be processed is melted to evenly disperse polyurethane, in which state they are blended. The mixture is extruded to the molding die 10 from a screen 76 and an extrusion die 77 and extruded as a material 79.

The molding die 10 has a shape similar to a so-called T die type molding die, which is connected to the extruding machine 70 through the extrusion die 77 and which comprises an inlet connected to the extrusion die 77 and a molding chamber for molding the extruded material 79 introduced from the inlet into a wide plate having a predetermined wall-thickness. The molding chamber is interiorly formed with a melting section having a heater disposed in the outer periphery thereof by 1/5 of the length of the molding chamber from the neighborhood of the inlet toward the extruding direction of the extruded material 79, whereas the other portion is formed with a gradual cooling section having a cooling pipe disposed in the outer periphery thereof from a boundary of said melting section to the die outlet toward the extruding direction of the extruded material 79.

The extruded material 79 extruded from the extrusion die 77 connected to the extruding machine 70 is introduced from the inlet of the molding die 10 and flows widthwise of the molding chamber of the molding die 10. The extruded material 79 which flows within the melting section of the molding chamber is extruded while maintaining a well blended state.

As for one example, the molding die 10 has an elongated rectangular section having 640 mm of width and 12 mm of height, and the distance from the inlet of the molding chamber to the die outlet (the distance of the extruding direction) is 600 mm. Four inner wall surfaces (upper, lower, left and right) of the molding chamber have sheets formed of fluorine plastics having 0.25 mm of thickness affixed thereto. The sheet is particularly preferably a sheet in which fluorine plastics are coated on the surface of a glass woven cloth. The fluorine plastics include Teflon TFE, Teflon EEP, Teflon CTFE, Teflon VDF, etc. The glass woven cloth may be of a nonwoven cloth of glass fibers.

The fluorine plastics have a heat resistance to about 300° C., have a smooth surface having a small coefficient of friction and have properties in that a coefficient of heat conduction thereof is lower than metal. Therefore, urethane within the extruded material 79 passing through the molding chamber smoothly flows without subjecting to a high resistance. Therefore, the blending state of the extruded material 79 is in a good state.

The resistant force is applied to the molded plate 29 extruded from the die outlet 23 of the molding die 10 in the direction opposite to the extruding direction by brake means 30 to suppress the extruding force of the molded plate 29.

Figure 8:
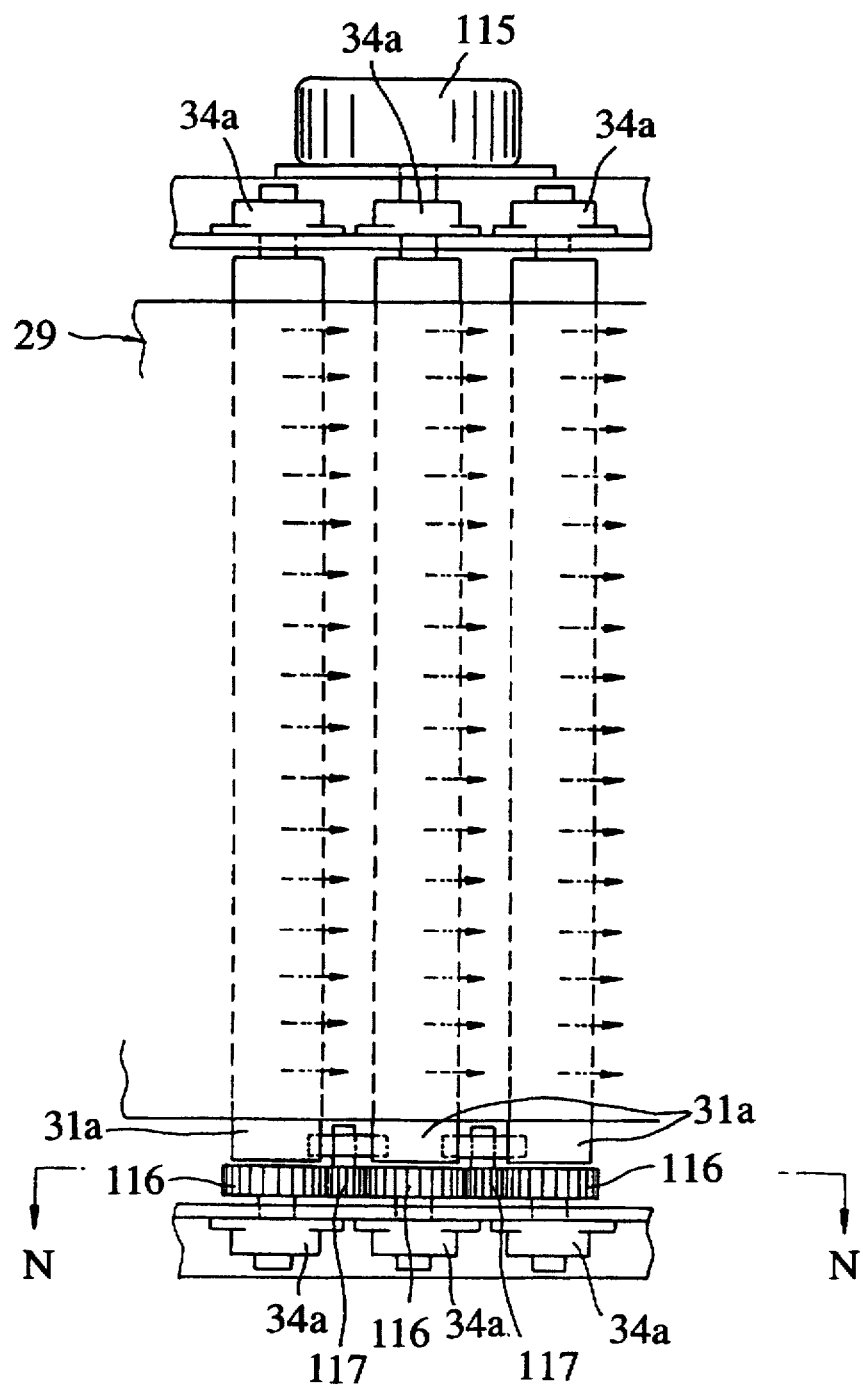
FIG. 8 is a plan view showing in section essential parts of a brake means used in the above embodiment of the present invention.
Figure 9:
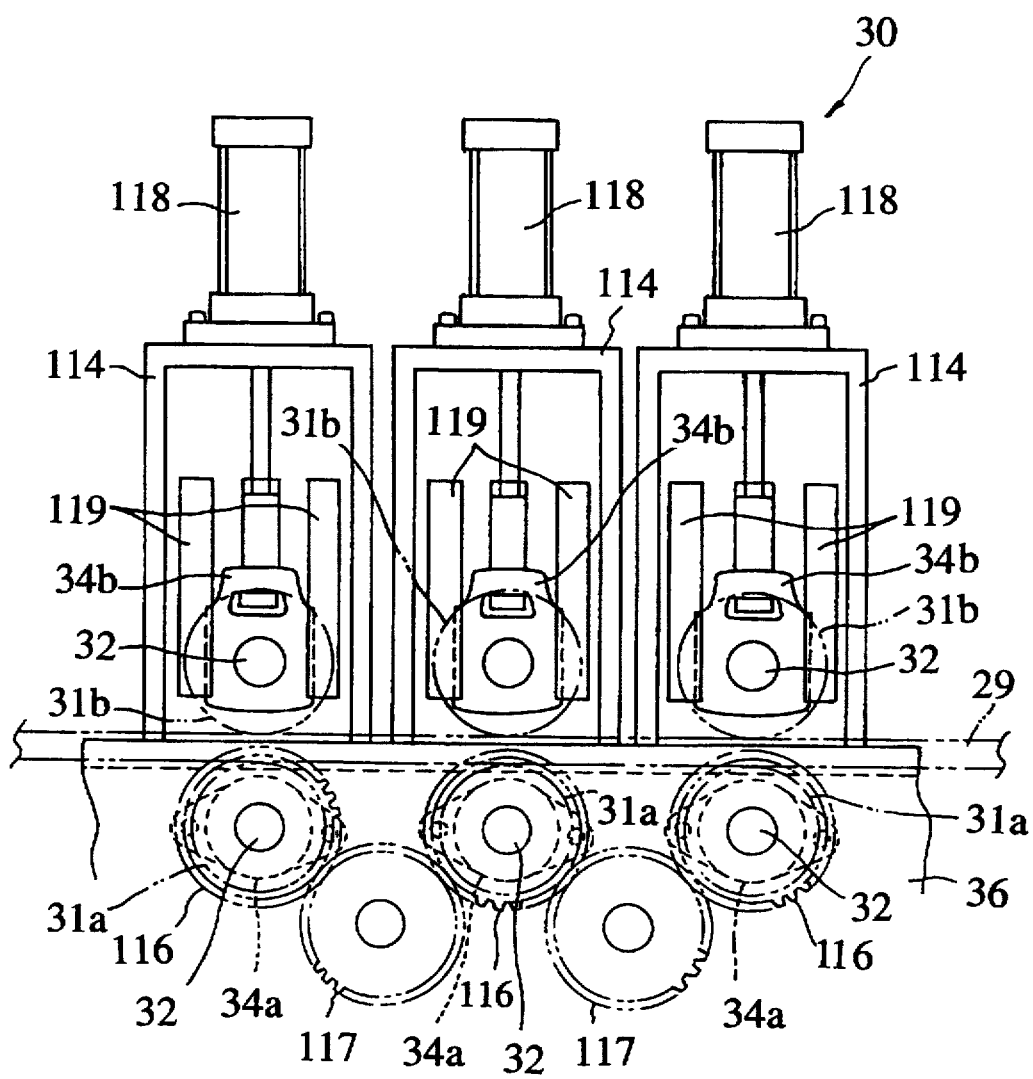
FIG. 9 is a longitudinal sectional view taken on line N—N in FIG. 8.

In FIGS. 8 and 9, bearings 34a for supporting opposite ends of shafts for three free pinch rollers 31b are secured to a bearing fixing frame 36. Fixed pinch rollers 31a are interlocked by a gear 116 provided on each shaft and a gear 117 meshed with the gear 116, and an input shaft of a powder brake 15 is connected to the shaft of one of the three fixed pinch rollers 31a. The powder brake 115 is a so-called electromagnetic brake, which can electrically delicately a frictional torque.

A frame 114 is stood upright on the bearing fixing frame 36, and two block-like guides 119 provided with a guide groove are provided substantially in parallel on the wall surface of the frame 11 so that the axial direction of the guides 119 is directed vertically. Bearings 34b for supporting opposite ends of the shafts of the three pinch rollers 31b are provided movably up and down along the guide groove of the guides 119, said bearings 34b being connected to the extreme ends of rods of three air cylinders 118 provided on the upper surface of the frames 114.

Accordingly, by the operation of the cylinders 118, the fixed pinch rollers 31a are pressed by the three free pinch rollers 31b through the molded plate 29. The shaft of one of the three fixed pinch rollers 31a is suppressed in rotation by the powder brake 115. Since the gear 116 provided on the shaft of the fixed pinch roller 31a is meshed with the gears 116, 116 provided on the shafts of the other two fixed pinch rollers 31a, 31a, the same rotation suppressing force caused by the frictional torque of the powder brake 115 exerts on the three fixed pinch rollers 31a.

Incidentally, the frictional torque for suppressing the rotation of the fixed pinch rollers 31a by the powder brake 115 is adjusted by the thickness of the molded plate 29.

Accordingly, the frictional torque of the powder brake 115 constitutes the suppressing force against the extruding force of the molded plate 29 to render the extruded material 79 within the introducing chamber 12 of the molding die 10 higher density and uniform. The extruded material 79 which is uniform and high in density advances against the suppressing force of the brake means 30 by the extruding force of the extruded material 79 by way of the extruding machine 70 and is cooled within the molding chamber 22 to form the molded plate 29. The molded plate 29 advance while rotating the fixed pinch rollers 31a and the free pinch rollers 31b against the suppressing force of the powder brake 115.

The suppressing force imparts a drag to the extruding force of the extruded material 79 within the molding chamber 22 applied by the extruding machine to the extruded material 79 within the molding chamber 22 and the introducing chamber 12 through the molded plate 29 whereby the entire extruded material 79 within the molding chamber 22 become more uniform and higher in density. Since the density of the extruded material 79 increases by applying the suppressing force to the molded plate 29, the contactness of the reprocessed resin is enhanced to prevent foam and cavity from occurrence in the molded plate. Accordingly, the molded plate of uniform and high density can be molded.

The extruded material 79 is introduced into the gradual cooling section of the molding chamber and gradually cooled, and the PP melted around the pulverized resin to be processed becomes gradually set. Then, the PP set by being cooled by cooling water flowing within the cooling pipe 25 within the gradual cooling section is present as a so-called crosslinking agent to bond the pulverized resins to be processed to form a molded plate having 12 mm of thickness, which is extruded by the extruded material 79. As a result, a molded plate formed of a polyurethane foamed material of uniform density as a main molding stock is molded.

Thereafter, the molded plate is cut into a desired length by a cutting machine such as a cutter, a shearing, a sawing machine or the like. When a height of the molding chamber of the molding die is reduced, a thin molded plate or sheet is formed. The thin molded plate or sheet can cut by a cutting machine such as a cutter, and a thick molded plate having 12 mm of thickness can be cut by a cutting machine such as a shearing, a sawing machine or the like.

Example of production of a molded plate obtained in the above-described embodiment is shown in Table 1 below.

TABLE 1

| Example of production of a molded plate using reprocessed resin | | |
|---|---|---|
| Extruder | Dia. 65 mm | Single-shaft extruder |
| Clearance | 0.2 mm (between screw 7 and barrel 74) | |
| Molding die | 10 width 640 mm, height 12 mm (width longitudinal section) | |
| Length of molding die | 600 mm (from molding chamber inlet to die outlet) | |
| Reprocessed resin | Bulk specific gravity | 0.439 |
| Thermoplastic resin molding material | PP | 45 wt % |
| | True specific gravity | 0.92 |
| | Bulk specific gravity | 0.54 |
| Thermoset resin foamed material | polyurethane foamed material | 55 wt % |
| (recovered from panel) | Bulk specific gravity | 0.118 |
| Pulverized resin to be processed | Bulk specific gravity | 0.14 |
| Molded plate | Thickness | 12 mm |
| | True specific gravity | 0.94 |

Molded plate, as the product, W: 640 mm, H: 12 mm is cut every 1820 mm by a sawing machine to obtain a molded plate having 14.5 kg of weight. The molded plate having 10 to 12 mm of thickness is used for a buffer material, a cushioning material, a sound-absorbent material, a heat insulating material for a refrigerator and other uses.

Incidentally, in case of the molded plate of specific gravity 0.94, it indicates that a molded plate of high density was obtained by the above-described extrusion molding method.

According to the present invention, the reprocessed resin could be formed whose bulk specific gravity about 7 to 8 times of that of the thermoset resin foamed material before the thermoset resin foamed material and the thermoplastic resin molding material are gelled and blended. This means that the volume of the reprocessed resin is reduced in volume by 14% to 12.5% of that of the thermoset resin foamed material before being gelled and blended, thus enabling considerable decreased in volume with respect to the thermoset resin foamed material, which is effective not only for reproduction as a raw pellet but for discard disposition.

Further, according to the present invention, the thermoset resin foamed material is pulverized by the stirring impact force and the thermoplastic resin molding material is melted by the shearing heat generation based on the stirring impact force but the thermoset resin foamed material is not melted. Therefore, the pulverized resin to be processed and the thermoplastic resin molding material pulverized in this process are gelled and blended, and the thermoplastic resin molding material is adhered to the whose surface of the individual pulverized resin to be processed to form a state where the thermoplastic resin molding material is solidified to a thermally and chemically stabilized pulverized resin to be processed. The reprocessed resin which imparts a good flowability was formed in order to stationarily maintain the mixed and dispersed state of the pulverized resin to be processed and the thermoplastic resin molding material.

Furthermore, according to the present invention, when the reprocessed resin is used to mold it by molding methods such as extrusion molding or injection molding, the extruded material in a good blended state can be formed, and the frictional resistance of the pulverized resin to be processed can be reduced. A molded product of uniform density formed of a main molding stock for a thermoset resin formed material can be molded.

In particular, in case of a single reprocessed resin, or along with the aforementioned other recovered resin materials, or in the form of a raw pellet as a molding stock such as a compound, characteristics of the aforementioned flowability and the uniform density of molded articles are further enhanced.

Moreover, for the above reasons, the mixing rate of the thermoset resin foamed material within the molded article can be increased, and the reprocessed resin capable of efficiently recycling the thermoset resin foamed material can be formed. Accordingly, the reprocess resin and the reprocessing method according to the present invention is a method free from an important problem represented by a conventional chemical recycle, and there can provide a positive recycling method which can render possible not only a negative recycle in a narrow range such as a mere energy recovery by a filler or burning but also a recycle in a wide range such as a raw pellet in addition to high utility efficiency.

Further, according to the present invention, molded articles molded by an extrusion molding method comprising: heating and kneading a reprocessed resin, gradually cooling an extruded material extruded to a molding die by a screw, and applying a suppressing force against an extrusion force to the extruded material to increase the density of the extruded material are extruded to the molding die in the good blended state of the heated and kneaded extruded material and in the state where the frictional resistance of the reprocessed resin is reduced and the suppressing force against the extrusion force to the extruded material to thereby mold molded articles of uniform and high density.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heat of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustration and not in a limiting sense. It is also to be understood that the following claims are intended to cover all of the generic and specific features of the invention herein described, and all statements of the scope of the invention which, as a matter of language, might be said to fall therebetween.

Now that the invention has been described:

What is claimed is:

1. A reprocessed resin comprising a mixture of 30 to 80 wt. % of thermoplastic resin molding material and 20 to 70 wt. % of pulverized resin to be processed having a bulk specific gravity increased to 0.1 to 0.2 obtained by pulverizing a thermoset foamed material, whereby the mixture is gelled and blended to granulate the material to 15 mm or less of a particle diameter, said thermoplastic resin molding material is fixed on a surface of the pulverized resin material to be processed, and thereby decreasing the volume of said thermoset resin foamed material in volume by 0.3 or more in the bulk specific gravity.

* * * * *